United States Patent
Zheng et al.

(10) Patent No.: US 9,049,444 B2
(45) Date of Patent: Jun. 2, 2015

(54) MODE DEPENDENT SCANNING OF COEFFICIENTS OF A BLOCK OF VIDEO DATA

(75) Inventors: Yunfei Zheng, San Diego, CA (US); Muhammed Zeyd Coban, Carlsbad, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 13/179,321

(22) Filed: Jul. 8, 2011

(65) Prior Publication Data

US 2012/0163455 A1 Jun. 28, 2012

Related U.S. Application Data

(60) Provisional application No. 61/426,372, filed on Dec. 22, 2010, provisional application No. 61/426,349, filed on Dec. 22, 2010, provisional application No. 61/436,835, filed on Jan. 27, 2011.

(51) Int. Cl.
| | |
|---|---|
| *H04B 1/00* | (2006.01) |
| *H04N 19/157* | (2014.01) |
| *H04N 19/176* | (2014.01) |
| *H04N 19/46* | (2014.01) |
| *H04N 19/196* | (2014.01) |
| *H04N 19/134* | (2014.01) |

(Continued)

(52) U.S. Cl.
CPC .......... *H04N 19/157* (2014.11); *H04N 19/176* (2014.11); *H04N 19/46* (2014.11); *H04N 19/196* (2014.11); *H04N 19/134* (2014.11); *H04N 19/129* (2014.11); *H04N 19/146* (2014.11)

(58) Field of Classification Search
CPC .......... H04N 7/26095; H04N 7/26026; H04N 19/129
USPC .............. 375/240.13, 240.12, 240.25, 240.18
See application file for complete search history.

(56) References Cited

U.S. PATENT DOCUMENTS

| | | | |
|---|---|---|---|
| 6,054,943 | A | 4/2000 | Lawrence |
| 6,532,306 | B1 | 3/2003 | Boon et al. |

(Continued)

FOREIGN PATENT DOCUMENTS

| | | |
|---|---|---|
| JP | 2000013609 A | 1/2000 |
| JP | 2010004284 A | 1/2010 |
| WO | 2007079782 A1 | 7/2007 |

OTHER PUBLICATIONS

Low Complexity adaptive coeffcients scanning , Vadim Seregin , Samsung Electronics Co.,Ltd , Joint Collaborative Team on Video mCoding, Oct. 7-15, 2010.*

(Continued)

*Primary Examiner* — Tung Vo
*Assistant Examiner* — Rowina Cattungal
(74) *Attorney, Agent, or Firm* — Shumaker & Sieffert, P.A.

(57) ABSTRACT

This disclosure describes apparatuses and methods of encoding coefficients associated with a block of video data. In one example, a method may comprise selecting a scan order for the coefficients based on an intra coding mode used to predict the block of video data and a transform block size used in transforming the block of video data, and generating a syntax element to communicate the selected scan order for the block of video data.

30 Claims, 11 Drawing Sheets

TABLE 2

| preMode / blkSize | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| 128x128 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 64x64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 32x32 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16x16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8x8 | 1 | 2 | 0 | 0 | 1 | 1 | 0 | 2 | 2 | 0 | 0 | 1 | 1 | 0 | 0 | 2 | 2 | 0 | 0 | 0 | 1 | 1 | 1 | 1 | 0 | 0 | 0 | 0 | 2 | 2 | 2 | 2 | 0 | 0 |
| 4x4 | 1 | 2 | 0 | 0 | 1 | 1 | 0 | 2 | 2 | 0 | 0 | 1 | 1 | 0 | 0 | 2 | 2 | 0 | 0 | 0 | 1 | 1 | 1 | 1 | 0 | 0 | 0 | 0 | 2 | 2 | 2 | 2 | 0 | 0 |
| 2x2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

(51) Int. Cl.
H04N 19/129 (2014.01)
H04N 19/146 (2014.01)

(56) References Cited

U.S. PATENT DOCUMENTS

| | | | |
|---|---|---|---|
| 6,795,584 B2 | 9/2004 | Karczewicz et al. | |
| 6,870,963 B2 | 3/2005 | Govindaswamy et al. | |
| 8,913,666 B2 | 12/2014 | Sole Rojals et al. | |
| 2002/0173952 A1 | 11/2002 | Mietens et al. | |
| 2004/0022446 A1 | 2/2004 | Taubman | |
| 2005/0068208 A1 | 3/2005 | Liang et al. | |
| 2005/0078754 A1 | 4/2005 | Liang et al. | |
| 2006/0078049 A1 | 4/2006 | Bao et al. | |
| 2006/0256854 A1 | 11/2006 | Jiang | |
| 2008/0002767 A1 | 1/2008 | Schwarz et al. | |
| 2008/0013622 A1 | 1/2008 | Bao et al. | |
| 2008/0089421 A1 | 4/2008 | Je-Chang et al. | |
| 2009/0232211 A1* | 9/2009 | Chen et al. | 375/240.13 |
| 2009/0257489 A1 | 10/2009 | Karczewicz et al. | |
| 2010/0124284 A1 | 5/2010 | Lee et al. | |
| 2010/0135389 A1* | 6/2010 | Tanizawa et al. | 375/240.12 |
| 2010/0177820 A1 | 7/2010 | Chono et al. | |
| 2010/0284459 A1 | 11/2010 | Jeong et al. | |
| 2011/0206135 A1 | 8/2011 | Drugeon et al. | |
| 2011/0280314 A1* | 11/2011 | Sankaran et al. | 375/240.25 |
| 2012/0008683 A1 | 1/2012 | Karczewicz et al. | |
| 2012/0121011 A1 | 5/2012 | Coban et al. | |
| 2012/0163469 A1* | 6/2012 | Kim et al. | 375/240.18 |
| 2013/0188699 A1 | 7/2013 | Joshi et al. | |

OTHER PUBLICATIONS

Low complexity adaptive coefficients scanning, Samsung Electronics Co., Ltd, Vadim Seregin , Oct. 2010.*
Low-Complexity Adaptive Coefficients Scanning, Vadim Seregin, Samsung Electronics Co., Ltd.*
Sze, V. et al, "TE-8: Evaluation of RIM parallel context processing (PCP) proposal," JCT-VC, Document JCTVC-C063, Oct. 2010, 4 pp.
Sze, V. et al., "Parallelization of HHI_Transform_Coding," JCT-VC, Document JCTVC-C227, Oct. 2010, 11 pp.
Budagavi, M. et al., "TE8: TI Parallel context processing (PCP) proposal," JCT-VC, Document JCTVC-C062, Oct. 2010, 7 pp.
Lee et al., "Adaptive Scanning for H.264/AVC Intra Coding," ETRI Journal, vol. 28, No. 5, pp. 668-671, Oct. 2006.
Jia et al., "Adaptive Transform Coefficient Scan for H.264 Intra Coding," IEICE Trans. Inf. & Syst., vol. E90-D, No. 10, pp. 1709-1711, Oct. 2007.
McCann et al., "Samsung's Response to the Call for Proposals on Video Compression Technology," Document: JCTVC-A124, 1st Meeting: Dresden, DE, Apr. 15-23, 2010, 42 pp.
Seregin et al., "Low-complexity adaptive coefficients scanning," Document: JCTVC-C205, 3rd Meeting: Guangzhou, CN, Oct. 7-15, 2010.
Karczewicz et al., "Video coding technology proposal by Qualcomm Inc.," Document: JCTVC-A121, 1st Meeting: Dresden, DE, Apr. 15-23, 2010, 24 pp.
Anonymous: "Test Model under Consideration", 2. JCT-VC Meeting; Jul. 21, 2010-Jul. 28, 2010; Geneva; (Joint Collaborativeteam on Video Coding of ISO/IEC JTC1/SC29/WG11 and ITU-T SG.16); JCTVC-B205, Jul. 28, 2010, XP030007704, ISSN: 0000-0046, URL:http://wftp3.itu.int/av-arch/jctvc-site/.
Auyeung et al.,: "Parallel processing friendly simplified context selection of significance map", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jc tvc-site/, No. JCTVC-D260, Jan. 16, 2011, XP030008300, ISSN: 0000-0013 the whole document.
Chengji Tu et al., "Context-Based Entropy Coding of Block Transform Coefficients for Image Compression", IEEE Transactions on Image Processing, IEEE Service Center, Piscataway, NJ, US, vol. 11, No. 11, Nov. 1, 2002, XP011074327, ISSN: 1057-7149 figures 9-11, sections V I and VI-A, equations (7)-(10).
Chujoh et al., "Video coding technology proposal by Toshiba", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16); XP030007558, Apr. 18, 2010, XP030007559, ISSN: 0000-0049, URL: http://wftp3.itu.int/av-arch/jctvc-site/.
International Search Report and Written Opinion—PCT/US2011/064964—ISA/EPO—Feb. 17, 2012.
Lou et al: "Parallel processing friendly context modeling for significance map coding in CABAC", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jc tvc-site/, No. JCTVC-D241, Jan. 19, 2011, XP030008281, ISSN: 0000-0013 the whole document.
Kung et al., "Block based parallel motion estimation using programmable graphics hardware", Audio, Language and Image Processing, 2008. ICALIP 2008. International Conference on, IEEE, Piscataway, NJ, USA, Jul. 7, 2008, pp. 599-603, XP031298532, ISBN: 978-1-4244-1723-0 section 3.2 figure 4.
Lou et al., "Zigzag scan for CABAC/PIPE", 94. MPEG Meeting; Oct. 11, 2010-Oct. 15, 2010; Guangzhou; (Motion Picture Expert Group or ISO/IEC JTC1/SC29/WG11) No. M18137, Oct. 28, 2010, XP030046727.
Cheung et al., Highly Parallel Rate-Distortion Optimized Intra-Mode Decision on Multicore Graphics Processor , IEEE Transactions on Circuits and Systems for Video Technology, IEEE Service Center, Piscataway, NJ, US, vol. 19, No. 11, Nov. 1, 2009, pp. 1692-1703, XP011276003, ISSN: 1051-8215, DOI: 10.1109/TCSVT.2009.2031515, section 111.0, figures 3, 4, 6.
Sole J et al: "Parallel Context Processing for the significance map in high coding efficiency", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/, No. JCTVC-D262, Jan. 16, 2011, XP030008302, ISSN: 0000-0013 the whole document.
Turaga et al., "Parallel processing of multi-dimensional data with causal neighborhood dependencies", VCIP—SPIE, vol. 6822, No. 6822-19, Jan. 28, 2008, XP040431672, sections 2 and 3.
Winken M., et al., "Video coding technology proposal by Fraunhofer HHI", 1. JCT-VC Meeting; Apr. 15, 2010-Apr. 23, 2010; Dresden; (Jointcollaborative Team on Video Coding of ISO/IEC JTC1/SC29/WG11 and ITU-TSG. 16) ; URL: http://WFTP3.ITU. INT/AV-ARCH/JCTVC-SITE/, No. XP030007556, Apr. 24, 2010, XP030007557.
Ye (Qualcomm): "Improved intra coding", 33. VCEG Meeting; 82. MPEG Meeting; Oct. 20, 2007; Shenzhen; (Video Coding Experts Group of ITU-T SG.16), No. VCEG-AG11, Oct. 20, 2007, XP030003615, ISSN: 0000-0095.
Yeo et al., "Mode-Dependent Coefficient Scanning for Intra Prediction Residual Coding", 4. JCT-VC Meeting; 95. MPEG Meeting; Jan. 20, 2011-Jan. 28, 2011; Daegu; (Joint Collaborative Team On Video Coding of ISO/IEC JTC1/SC29/WG11AND ITU-T SG.16); No. JCTVC-D049, Jan. 15, 2011, XP030008090, ISSN: 0000-0015, URL: http://wftp3.itu.int/av-arch/jctvc-site/.
Yu Y et al: "Adaptive Scan for Large Blocks for HEVC", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ); No. JCTVC-F569, Jul. 16, 2011, XP030009592, URL: http://wftp3.itu.int/av-arch/jctvc-site/.
Yung-Chiang Wei, "Adaptive mode-dependent scan for H.264/AVC intracoding", Journal of Electronic Imaging, Aug. 11, 2010, vol. 19, No. 3, XP040541799.
Zeng et al., "Directional Discrete Cosine Transforms for Image Coding", IEEE International Conference on Multimedia and Expo (ICME 2006), Jul. 1, 2006, pp. 721-724, IEEE, XP031032937, ISBN: 978-1-4244-0366-0.
Zheng et al., "CELL: Mode Dependent Coefficient Scanning", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11AND ITU-T SG.16); No. JCTVC-D393, Jan. 16, 2011, XP030008432, ISSN: 0000-0013, URL: http://wftp3.itu.int/av-arch/jctvc-site.

(56) References Cited

OTHER PUBLICATIONS

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand, T., et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 193 pp.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

International Preliminary Report on Patentability from International Application No. PCT/US2011/064964, dated Mar. 19, 2013, 9 pp.

Second Written Opinion from International Application No. PCT/US2011/064964, dated Nov. 20, 2012, 8 pp.

Tu, et al., "Context-Based Entropy Coding of Block Transform Coefficients for Image Compressin", IEEE Transactions on Image Processing, IEE Service Center, Piscataway, NJ, US, vol. 11, No. 11, Nov. 1, 2002 (Jan. 1, 2002), XP011074327, pp. 620-636.

ITU-T H.265, Series H: Audiovisual and Multimedia Systems, Infrastructure of audiovisual services—Coding of moving video, High efficiency video coding, The International Telecommunication Union, Apr. 2013, 317 pp.

Tu, et al., "Context-Based Entropy Coding of Block Transform Coefficients for Image Compression", IEEE Transactions on Image Processing, Nov. 2002, vol. 11, No. 11, pp. 1271-1283.

\* cited by examiner

TABLE 1

| scanIdx | Value |
|---|---|
| Zigzag | 0 |
| Horizontal | 1 |
| Vertical | 2 |

FIG. 9

TABLE 2

| preMode / blkSize | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| 128x128 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 64x64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 32x32 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16x16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8x8 | 0 | 1 | 2 | 0 | 1 | 1 | 0 | 2 | 2 | 0 | 0 | 1 | 1 | 0 | 0 | 2 | 2 | 0 | 0 | 1 | 1 | 1 | 1 | 1 | 0 | 0 | 0 | 0 | 2 | 2 | 2 | 2 | 0 | 0 |
| 4x4 | 0 | 1 | 2 | 0 | 1 | 1 | 0 | 2 | 2 | 0 | 0 | 1 | 1 | 0 | 0 | 2 | 2 | 0 | 0 | 1 | 1 | 1 | 1 | 1 | 0 | 0 | 0 | 0 | 2 | 2 | 2 | 2 | 0 | 0 |
| 2x2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 10

TABLE 3

| Mode<br>TU | 0 | 1 | 2 | 3 | 4 |
|---|---|---|---|---|---|
| 32x32 | 0 | 0 | 0 | 0 | Same as corresponding luma block |
| 16x16 | 0 | 0 | 0 | 0 | Same as corresponding luma block |
| 8x8 | 0 | 0 | 0 | 0 | Same as corresponding luma block |
| 4x4 | 1 | 2 | 0 | 0 | Same as corresponding luma block |
| 2x2 | 1 | 2 | 0 | 0 | Same as corresponding luma block |

FIG. 11

TABLE 4

| scanIdx | Value |
|---|---|
| Zigzag | 0 |
| Horizontal | 1 |
| Vertical | 2 |
| Partial_horizontal | 3 |
| Partial_vertical | 4 |

FIG. 12

*TABLE 5*

| preMode / candidate | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| candidate0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| candidate1 | 1 | 2 | 2 | 2 | 1 | 1 | 2 | 2 | 2 | 2 | 1 | 1 | 1 | 3 | 2 | 2 | 2 | 2 | 2 | 1 | 1 | 1 | 1 | 1 | 1 | 2 | 2 | 2 | 2 | 2 | 2 | 2 | 2 | 2 |
| candidate2 | 3 | 4 | 3 | 3 | 3 | 3 | 4 | 4 | 4 | 3 | 3 | 3 | 3 | 4 | 4 | 4 | 4 | 4 | 3 | 3 | 3 | 3 | 3 | 3 | 3 | 3 | 3 | 4 | 4 | 4 | 4 | 4 | 4 | 4 |

FIG. 13

MODE DEPENDENT SCANNING OF COEFFICIENTS OF A BLOCK OF VIDEO DATA

This application claims the benefit of the following U.S. Provisional Applications: U.S. Provisional Application No. 61/426,372, filed on Dec. 22, 2010; U.S. Provisional Application No. 61/426,349, filed on Dec. 22, 2010; and U.S. Provisional Application No. 61/436,835, filed on Jan. 27, 2011, the entire content of each of which is incorporated herein by reference.

TECHNICAL FIELD

This disclosure relates to block-based video encoding techniques used to compress video data and, more particularly, scanning techniques used to serialize video block data during the encoding process.

BACKGROUND

Digital video capabilities can be incorporated into a wide range of video devices, including digital televisions, digital direct broadcast systems, wireless communication devices such as wireless telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and/or temporal prediction to reduce or remove redundancy inherent in video sequences. New video standards, such as the High Efficiency Video Coding (HEVC) standard being developed by the "Joint Collaborative Team-Video Coding" (JCTVC), which is a collaboration between MPEG and ITU-T, continue to emerge and evolve. The emerging HEVC standard is sometimes referred to as H.265.

These and other video coding standards and techniques use block-based video coding. Block-based video coding techniques divide the video data of a video frame (or portion thereof) into video blocks and then encode the video blocks using predictive block-based compression techniques. The video blocks may be further divided into video block partitions. The video blocks (or partitions thereof) may be referred to as coded units (CUs) and may be encoded using one or more video-specific encoding techniques as well as general data compression techniques.

With the emerging HEVC standard, largest coded units (LCUs) may be divided into smaller and smaller CUs according to a quadtree partitioning scheme. The CUs may be predicted based on so-called prediction units (PUs), which can have partition sizes corresponding to the size of the CUs or smaller than the size of the CUs, such that multiple PUs can be used to predict a given CU. The CUs may be intra coded based on predictive data within the same frame or slice so as to exploit spatial redundancy within a video frame. Alternatively, the CUs may be inter coded based on predictive data from another frame or slice, so as to exploit temporal redundancy across frames of a video sequence. After the predictive coding (intra or inter), transform coding may then be performed, such as discrete cosine transforms (DCT), integer transforms or the like. With HEVC, the transform coding may occur with respect to transform units (TUs), which can also have varying transform sizes in the HEVC standard. Quantization of the transform coefficients, scanning of the quantized transform coefficients, and entropy coding may also be performed. Syntax information is signaled with encoded video data, e.g., in a video slice header or video block header, in order to inform the decoder how to decode the video data.

SUMMARY

This disclosure describes techniques in which different scan orders are defined and used for different intra prediction modes based on the type of intra prediction mode and the transform block size used in transforming a given block of transform coefficients. In one example, selection of a scan order may be among horizontal, vertical and raster scan orders, although other scan orders may also be supported. A desirable scan order, e.g., in the sense of a rate-distortion metric for the encoded video data, can be decided by the encoder by searching among zigzag, horizontal, and vertical scan orders, and comparing the coding results. The best scan order can be selected and used for the encoding, and then signaled within the bitstream (e.g., as a block level syntax element) to the decoder. The improvement in performance that can result from the use of different scan orders may add complexity to the encoder because of the exhaustive searching for the best scan order. However, to balance the added complexity, the number of possible scan orders may be limited, and a switchable signaling scheme may be used to index the possible scan orders for purposes of signaling the selected scan order for a video block. Both a fixed example and a switchable example of the techniques are explained in greater detail below.

In one example, this disclosure describes a method of encoding coefficients associated with a block of video data. The method comprises selecting a scan order for the coefficients based on an intra coding mode used to predict the block of video data and a transform block size used in transforming the block of video data, and generating a syntax element to communicate the selected scan order for the block of video data.

In another example, this disclosure describes a method of decoding coefficients associated with a block of video data. The method comprises receiving a syntax element with the block of video data, wherein the syntax element defines a scan order from a set of top scan order candidates, defining the set of top scan order candidates based on one or both of an intra coding mode used to predict the block of video data and a transform block size used in transforming the block of video data, and inverse scanning the block of video data from a serialized representation of the block of video data to a two-dimensional representation of the block of video data based on the syntax element relative to the defined set of top scan order candidates.

In another example, this disclosure describes a video encoding device that encodes coefficients associated with a block of video data, the video encoding device comprising a prediction unit that performs intra prediction coding of the block of video data based on an intra coding mode, a transform unit that determines a transform size and performs a transform on the block of video data according to the transform size, and a scan unit that selects a scan order for the coefficients based on the intra coding mode used to predict the block of video data and the transform block size used in transforming the block of video data, and generates a syntax element to communicate the selected scan order for the block of video data.

In another example, this disclosure describes a video decoding device that decodes coefficients associated with a block of video data, the video decoding device comprising a unit that receives a syntax element with the block of data, wherein the syntax element defines a scan order from a set of top scan order candidates, and a scan unit that defines the set of top scan order candidates based on one or both of an intra coding mode used to predict the block of video data and a transform block size used in transforming the block of video data. The scan unit performs inverse scanning the block of video data from a serialized representation of the block of video data to a two-dimensional representation of the block of video data based on the syntax element relative to the defined set of top scan order candidates.

In another example, this disclosure describes a device that encodes coefficients associated with a block of video data, the device comprising means for selecting a scan order for the coefficients based on an intra coding mode used to predict the block of video data and a transform block size used in transforming the block of video data, and means for generating a syntax element to communicate the selected scan order for the block of video data.

In another example, this disclosure describes a device that decodes coefficients associated with a block of video data, the device comprising means for receiving a syntax element with the block of video data, wherein the syntax element defines a scan order from a set of top scan order candidates, means for defining the set of top scan order candidates based on one or both of an intra coding mode used to predict the block of video data and a transform block size used in transforming the block of video data, and means for inverse scanning the block of video data from a serialized representation of the block of video data to a two-dimensional representation of the block of video data based on the syntax element relative to the defined set of top scan order candidates.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable storage medium and loaded and executed in the processor.

Accordingly, this disclosure also contemplates a computer-readable storage medium comprising instructions that, when executed, cause a processor to encode coefficients associated with a block of video data, wherein the instructions cause the processor to select a scan order for the coefficients based on an intra coding mode used to predict the block of video data and a transform block size used in transforming the block of video data, and generate a syntax element to communicate the selected scan order for the block of video data.

In addition, this disclosure describes a computer-readable medium comprising instructions that, when executed, cause a processor to decode coefficients associated with a block of video data, wherein the instructions cause the processor to upon receiving a syntax element with the block of video data, wherein the syntax element defines a scan order from a set of top scan order candidates, define the set of top scan order candidates based on one or both of an intra coding mode used to predict the block of video data and a transform block size used in transforming the block of video data, inverse scan the block of video data from a serialized representation of the block of video data to a two-dimensional representation of the block of video data based on the syntax element relative to the defined set of top scan order candidates.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 9-13 are tables that could be used to implement techniques of this disclosure.

DETAILED DESCRIPTION

Figure 1:
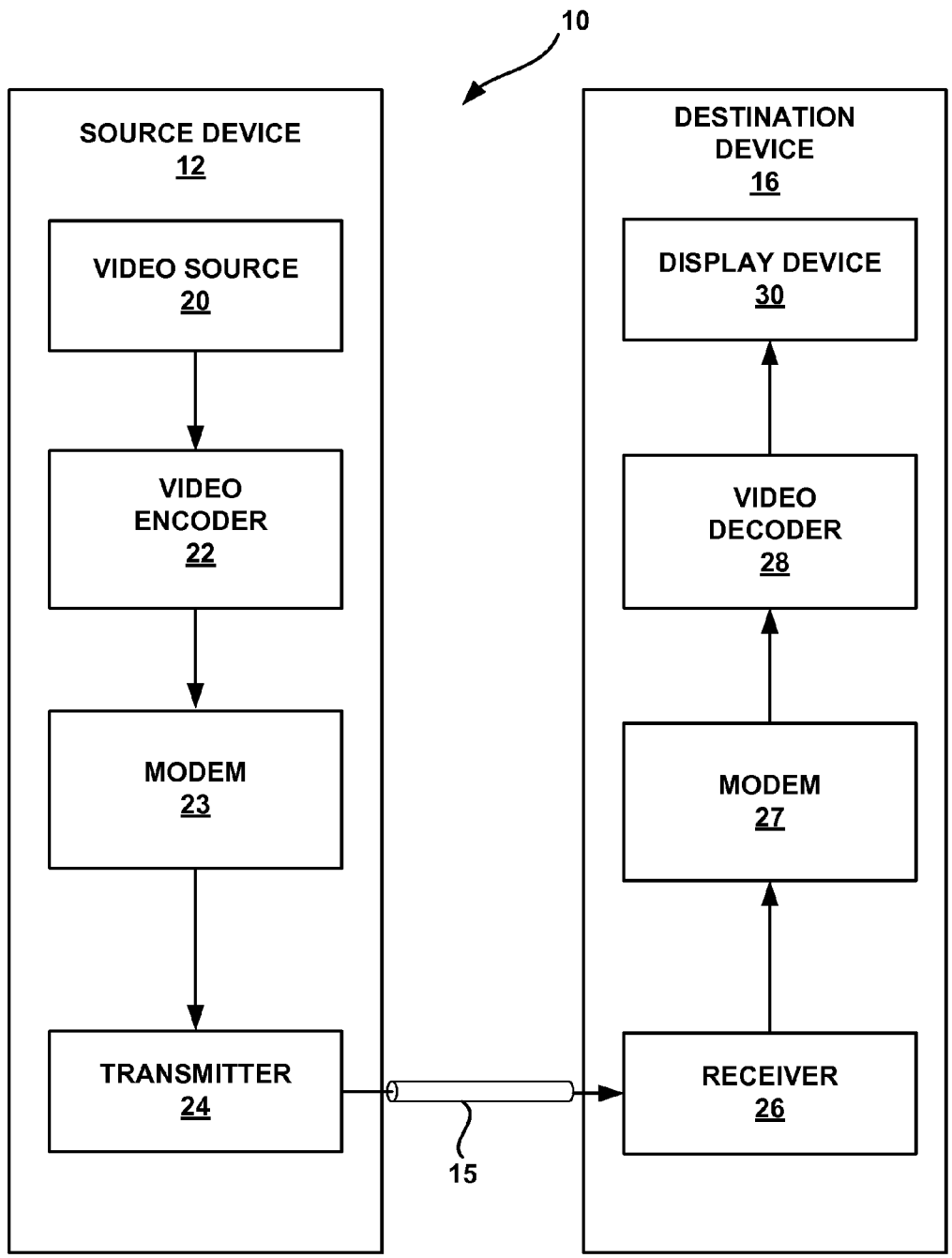
FIG. 1 is a block diagram illustrating a video encoding and decoding system that may implement one or more of the techniques of this disclosure.

This disclosure relates to scanning techniques performed on coefficients of a block of video data. The coefficients may comprise so-called significant coefficients and zero-value coefficients, which are binary values or flags (i.e., 0 or 1) that define whether residual transform coefficients are significant (i.e., non-zero) or not (i.e., zero). The significant coefficients may define a significance map that defines which ones of the residual transform coefficients of a video block are significant and which ones are not significant. Level values may be defined in conjunction with the significant coefficients in order to define the actual values of non-zero residual transform coefficients. In this case, the significant coefficients and zero-value coefficients define whether residual transform coefficients are significant (i.e., non-zero) or not (i.e., zero), and level values define the actual values for transform coefficients that are significant.

The residual transform coefficients may comprise a block of transform coefficients in the frequency domain, which represent a distribution of energy associated with a set of residual pixel values. The residual pixel values may comprise a block of values representing the residual differences between a block of video data being encoded, and a block of predictive video data used for predictive encoding, in the spatial domain. The residual pixel values may be quantized or not quantized in different cases, and the techniques of this disclosure may apply to either or both cases. The block of predictive data may be intra predictive data from the same frame or slice as that of the video block being coded, or may be inter predictive data defined from a different frame or slice relative to that of the video block being coded. A transform, such as a discrete cosine transform (DCT) or conceptually similar process, may be applied to the residual pixel values to produce transform coefficients in a frequency domain. A significance map of significant coefficients may be created to represent whether transform coefficients are significant (i.e., non-zero) or not (i.e., zero).

In video coding, scanning techniques are typically performed to serialize a block of coefficients from a two-dimensional representation to a one-dimensional representation. In many cases, following transform, the residual coefficients that are located near the upper right-hand corner of a video block are most likely to be significant, although the location of high energy coefficients could be located elsewhere, due to directionality of the transform. So-called zig-zag scanning can be an effective scanning technique to serialize a block of significant coefficients (or a block of the residual transform coefficients) from a two-dimensional representation to a one-dimensional representation so as to group the coefficients together, e.g., near the front of the serialized one-dimensional representation. However, other scanning techniques (such as horizontal scanning, vertical scanning, combinations of zig-zag and horizontal scanning, combinations of zig-zag and vertical scanning, adaptive scanning, or other more complex scan patterns) may be more effective in some cases. Some intra coding modes often result in distributions of significant coefficients that are biased towards the left vertical edge of the block or the upper edge of the block of the block. In such cases, the use of a different scan order (e.g., non-zig-zag) may improve the coding efficiency of the video coding so as to improve video compression.

This disclosure describes techniques in which different scan orders are defined and used for different intra prediction modes based on the type of intra prediction mode and the transform block size used in transforming a given block of transform coefficients. In one example, the selection may be among horizontal, vertical and raster scan orders, although other scan orders may also be supported. The desired scan order, e.g., in the sense of coding bit rate versus distortion in the encoding process, can be determined at the encoder by searching among zigzag, horizontal, and vertical scan orders, and comparing the results in terms of compression and video quality. The scan order selected by the encoder can be transmitted as an index within the bistream (e.g., as block level syntax) to the decoder. The improvement in performance that can result from the use of different scan orders may add complexity to the encoder because of the exhaustive searching for the best scan order. For this reason, additional techniques may limit the level of searching to mitigate such complexity in the encoder.

In one example, a mode dependent fixed transform coefficient coding technique for intra block coding is proposed. The mode dependent fixed transform coefficient coding technique may associate the scan order (also called the "scanning order") with the intra prediction mode, which means the scan order for an intra prediction mode may be fixed for a given transform size. The encoder may avoid an exhaustive search among several scan orders in order to reduce complexity as if there are only a few possible scan orders, and at the same time, the techniques can exploit some of the benefits associated with an exhaustive search of all possible scan orders. Fixing the scan order for both encoding/decoding may be particularly desirable to support parallel implementation by both the encoding and decoding devices.

The techniques of this disclosure may apply to intra block coding. In H.264/AVC and the Test Model of the emerging HEVC standard, directional extrapolation methods may be used to predict an intra block. Because of the directional prediction (i.e., based on intra data within the same video slice), the residual block (in the pixel domain) usually exhibits its directional characteristics, which are then inherited into the transformed coefficient block (in the transform domain). For this reason, a mode dependent scanning scheme for transform coefficients (or simply for significant coefficients of a significance map) may be very useful to improve coding efficiency.

In another example, a mode dependent switchable transform coefficient coding technique may be used. In this case, top scanning order candidates may be defined for each prediction mode, for each transform size, or for combinations of prediction mode and transform size. The candidates in the set (i.e., the top scan order candidates) may differ based on both the prediction mode and block size used. In this case, the best scan order for a block may be determined by the encoder among the candidates in the set specified for the prediction mode, but the number of candidates may be fewer than the total number of possible scan orders. The technique may add some complexity to the encoder, but can limit the complexity to a fixed number of top candidate scan orders. The decoder may define the same set of top candidates as those defined at the encoder, so that the decoder can properly interpret the syntax elements to deterring the proper scan order to use.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply generally to scanning techniques in video encoding and video decoding, are not necessarily limited to wireless applications or settings, and may be applied to non-wireless devices including video encoding and/or decoding capabilities. Source device 12 and destination device 16 are merely examples of coding devices that can support the techniques described herein. Other video devices that may use techniques of this disclosure may include digital televisions, digital direct broadcast systems, a broad range of wireless communication devices, wireless broadcast systems, personal digital assistants (PDAs), laptop or desktop computers, tablet computers, digital cameras, digital recording devices, video gaming devices, video game consoles, personal multimedia players, and the like.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to perform scanning techniques of this disclosure during a video encoding process in order to serialize coefficients of a block of video data from a two-dimensional block format to a one-dimensional format. Syntax elements may be generated at video encoder 22 in order to signal how the coefficients were scanned, so that video decoder 28 can perform a reciprocal (i.e., inverse) scan. In some examples, both video encoder 22 and video decoder 28 may be configured to determine a set of top scan order candidates, e.g., based on contextual information. In other examples, video encoder 22 may determine the scan order and simply encode the scan order in syntax information, for use by video decoder 28.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA), orthogonal frequency division multiplexing (OFDM) or any other communication standard or technique. The encoded and modulated data can then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information. Again, the video decoding process performed by video decoder 28 may include reciprocal scanning techniques to those used by video encoder 22.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate substantially according to a video compression standard such as the emerging HEVC standard. However, the techniques of this disclosure may also be applied in the context of a variety of other video coding standards, including some old standards, or new or emerging standards.

Although not shown in FIG. 1, in some cases, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In this disclosure, the term coder refers to an encoder or a decoder, and the terms coder, encoder and decoder all refer to specific machines designed for the coding (encoding or decoding) of video data consistent with this disclosure.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or operations. In general, video encoder 22 operates on video blocks within individual video frames (or other independently defined units of video such as slices) in order to encode the video blocks. Frames, slices, portions of frames, groups of pictures, or other data structures may be defined as units of video information that include a plurality of video blocks. The video blocks may have fixed or varying sizes, and may differ in size according to a specified coding standard. In some cases, each video frame may include a series of independently decodable slices, and each slice may include a series of video blocks, which may be arranged into even smaller blocks.

Macroblocks are one type of video block defined by the ITU H.264 standard and other standards. Macroblocks typically refer to 16 by 16 blocks of data. The ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

The emerging HEVC standard defines new terms for video blocks. In particular, with HEVC, video blocks (or partitions thereof) may be referred to as "coded units" (CUs). With the HEVC standard, largest coded units (LCUs) may be divided into smaller and smaller CUs according to a quadtree partitioning scheme, and the different CUs that are defined in the scheme may be further partitioned into so-called prediction units (PUs). The LCUs, CUs, and PUs are all video blocks within the meaning of this disclosure. Other types of video blocks may also be used, consistent with the HEVC standard or other video coding standards. Thus, the phrase "video block" refers to any size of video block. Moreover, video blocks may sometimes refer to blocks of video data in the pixel domain, or blocks of data in a transform domain such as a discrete cosine transform (DCT) domain, a domain similar to DCT, a wavelet domain, or the like.

Furthermore, video blocks (or blocks of video data) may also refer to blocks of so-called significant coefficients. Indeed, the scanning techniques of this disclosure may be particularly useful in scanning such significant coefficients. Significant coefficients may comprise binary values or flags (i.e., 0 or 1) that define whether residual transform coefficients (again, which may be quantized or not quantized) are significant (i.e., non-zero) or not (i.e., zero). Level values may also be used along with significant coefficients to define the actual values of residual transform coefficients. The residual transform coefficients may comprise a block of coefficients in the frequency domain, which represent a distribution of energy associated with a set of residual pixel values. The residual pixel values, in turn, may comprise a block of values representing the residual differences between a block of video data being encoded, and a block of predictive video data used for predictive encoding. The block of predictive data may be intra predictive data from the same frame or slice as that of the video block being coded, or may be inter predictive data defined from a different frame or slice relative to that of the video block being coded. The scanning techniques of this disclosure may be used to select the scanning order for blocks of significant coefficients that are intra coded, although similar techniques can also be used for inter coded blocks.

Video encoder 22 may perform predictive coding in which a video block being coded is compared to one or more predictive candidates in order to identify a predictive block. This process of predictive coding may be intra (in which case the predictive data is generated based on neighboring intra data within the same video frame or slice) or inter (in which case the predictive data is generated based on video data in previous or subsequent frames or slices). Again, the scanning techniques of this disclosure may be used to select the scanning order for blocks of significant coefficients that are intra coded, although similar techniques might also be used for inter coded blocks.

After generating the predictive block, the differences between the current video block being coded and the predictive block are coded as a residual block, and prediction syntax (such as a motion vector in the case of inter coding, or a prediction mode in the case of intra coding) is used to identify the predictive block. The residual block (i.e., a block of residual values) may be transformed to produce a block of transform coefficients, and the transform coefficients can be quantized. However, the techniques of this disclosure may also apply in the case of non-quantized transform coefficients. Transform techniques may comprise a DCT process or conceptually similar process, integer transforms, wavelet transforms, or other types of transforms. In a DCT process, as an example, the transform process converts a set of pixel values (e.g., residual values indicating differences between actual values and predictive values) into transform coefficients, which may represent the energy of the pixel values in the frequency domain. The HEVC standard allows for transformations according to transformation units (TUs), which may be different for different CUs. The TUs are typically sized according to the size of CUs defined for a partitioned LCU, although this may not always be the case. Quantization is typically applied on the transform coefficients, and generally involves a process that limits the number of bits associated with any given transform coefficient.

Following transform and quantization, entropy coding may be performed on the quantized and transformed residual video blocks. Syntax elements, such as filter syntax information, partition size, motion vectors, prediction modes, or other information, may also be included in the entropy coded bitstream. In general, entropy coding comprises one or more processes that collectively compress a sequence of quantized transform coefficients and/or other syntax information. Scanning techniques may be performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

In some cases consistent with this disclosure, the quantized transform coefficients are encoded by first encoding a significance map comprising a set of significant coefficients within a transform block, and then encoding levels or values of non-zero transform coefficients. Again, the significant coefficients may comprise binary values or flags (i.e., 0 or 1) that define whether residual transform coefficients are significant (i.e., non-zero) or not (i.e., zero). Additional information may also be encoded to define the actual value or level associated with the significant coefficients in the significance map. The scanning techniques of this disclosure may apply to the scanning of the significance map.

As part of the encoding process, encoded video blocks may be decoded in order to generate the video data that is used for subsequent prediction-based coding of subsequent video blocks. This is often referred to as a decoding loop of the encoding process, and generally mimics the decoding that is performed by a decoder device. In the decoding loop of an encoder or a decoder, filtering techniques may be employed in order to improve video quality, e.g., smooth pixel boundaries and possibly remove artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data. The loop filtering often follows a separate deblock filtering process, which typically applies filtering to pixels that are on or near boundaries of adjacent video blocks in order to remove blockiness artifacts that manifest at video block boundaries.

Figure 2:
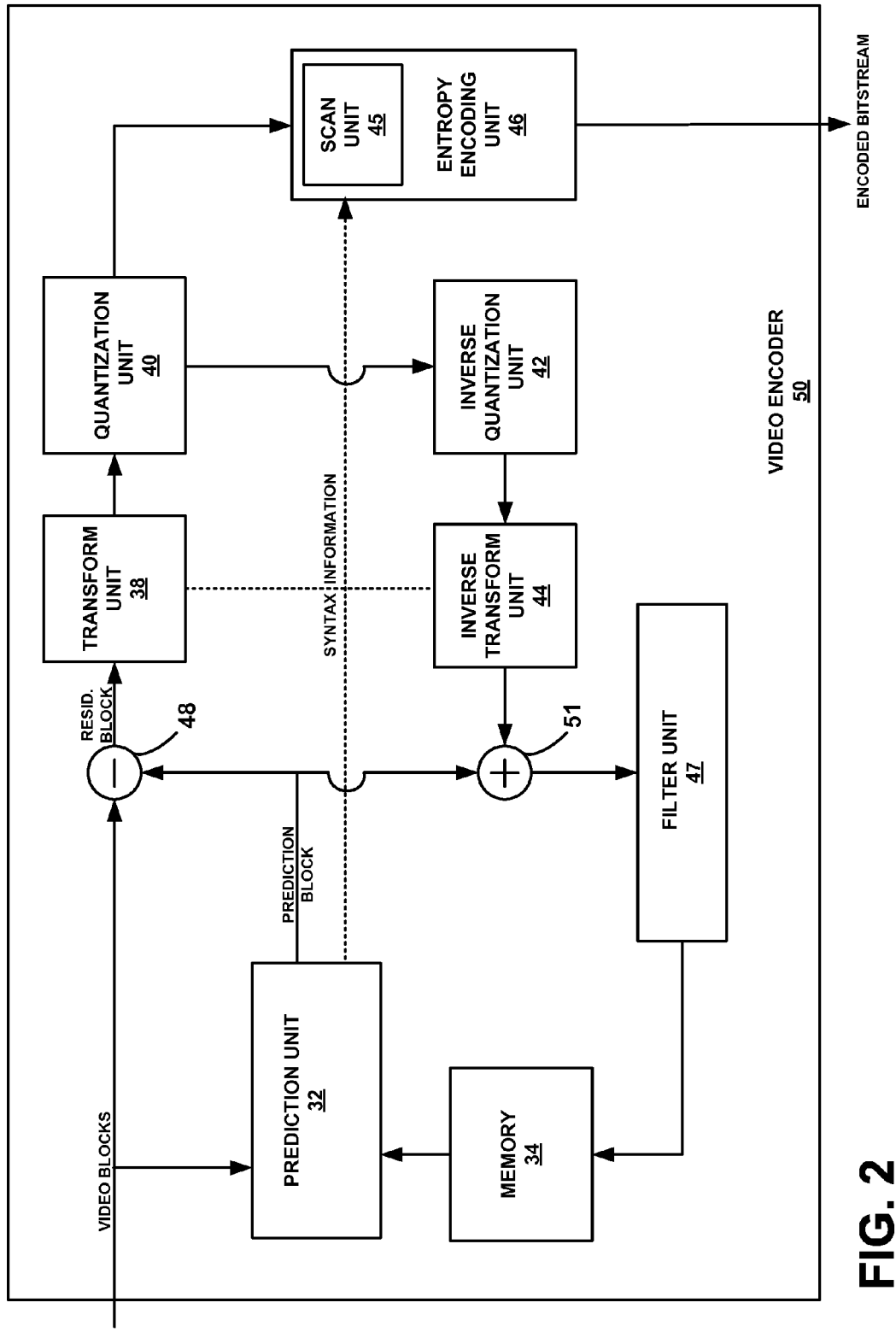
FIG. 2 is a block diagram illustrating an exemplary video encoder consistent with one or more examples of this disclosure.

FIG. 2 is a block diagram illustrating a video encoder 50 consistent with this disclosure. Video encoder 50 may correspond to video encoder 22 of device 20, or a video encoder of a different device. As shown in FIG. 2, video encoder 50 includes a prediction unit 32, adders 48 and 51, and a memory 34. Video encoder 50 also includes a transform unit 38 and a quantization unit 40, as well as an inverse quantization unit 42 and an inverse transform unit 44. Video encoder 50 also includes an entropy coding unit 46, and a filter unit 47, which may include deblock filters and post loop and/or in loop filters. The encoded video data and syntax information that defines the manner of the encoding may be communicated to entropy encoding unit 46. Entropy coding unit 46 includes a scan unit, which may perform the scanning techniques of this disclosure.

In particular, scan unit 45 may execute a method of encoding coefficients associated with a block of video data. The block of video data may comprise a CU within an LCU, wherein the LCU is partitioned into a set of CUs according to a quadtree partitioning scheme, consistent with the emerging HEVC standard. In encoding the coefficients, scan unit 45 may select a scan order for the coefficients (e.g., significant coefficients) based on an intra coding mode used by prediction unit 42 to predict the block of video data and a transform block size used by transform unit 38 to transform the block of video data. Scan unit 45 may generate a syntax element to communicate the selected scan order for the block of video data. As explained in greater detail below, scan unit 45 may select the scan order from a first lookup table for luma blocks, and may select the scan order from a second lookup table for chroma blocks. The different lookup tables may be stored in memory 34, which may be accessible by scan unit 45, or may be stored in another memory accessible by scan unit 45.

In some cases, rather than selecting the scan order from every possible scan order, scan unit 45 may define a set of top scan order candidates and select from the set of top scan order candidates. In this case, the decoder may be configured to define the same set of top scan order candidates as those defined at the encoder. Accordingly, the signaling between the encoder and decoder can be a switched signaling scheme in which an index value can define which of the top scan order candidates is used. The decoder may receive the index value, define the same set of top scan order candidates, and apply the index value to determine which of the top scan order candidates should be used.

In one switched signaling example, scan unit 45 defines a set of top scan order candidates for each of a plurality of possible intra coding modes based on a set of possible scan order candidates, selects the scan order from the set of top scan order candidates for the intra coding mode used to predict the block of video data, and generates the syntax element to identify the selected scan order from the set of top candidates associated with the intra coding mode used to predict the block of video data.

In another switched signaling example, scan unit 45 defines a set of top scan order candidates for each of a plurality of possible transform block sizes based on a set of possible scan order candidates, selects the scan order from the set of top scan order candidates for the intra coding mode used to predict the block of video data, and generates the syntax element to identify the selected scan order from the set of top candidates associated with the intra coding mode used to predict the block of video data.

In yet another switched signaling example, scan unit 45 defines a set of top scan order candidates for combinations of possible intra coding modes and possible transform block sizes based on a set of possible scan order candidates defined for the combinations of possible intra coding modes and possible transform block sizes, selects the scan order from the set of top scan order candidates for the intra coding mode used to predict the block of video data, and generates the syntax element to identify the selected scan order from the set of top candidates associated with the intra coding mode used to predict the block of video data.

Generally, during the encoding process, video encoder 50 receives a video block to be coded, and prediction unit 32 performs predictive coding techniques. The video block may comprise a CU as outlined above, or may generally comprise any block of video data consistent with a block-based video coding technique or standard. For inter coding, prediction unit 32 compares the video block to be encoded to various blocks in one or more video reference frames or slices (e.g., one or more "list" of reference data) in order to define a predictive block. Again, for intra coding, prediction unit 32 generates a predictive block based on neighboring data within the same coded unit. Prediction unit 32 outputs the prediction block and adder 48 subtracts the prediction block from the video block being coded in order to generate a residual block.

Alternatively, for inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. In some cases, motion compensation for inter-coding may include interpolations to sub-pixel resolution, which permits the motion estimation process to estimate motion of video blocks to such sub-pixel resolution.

After prediction unit 32 outputs the prediction block, and after adder 48 subtracts the prediction block from the video block being coded in order to generate a residual block, transform unit 38 applies a transform to the residual block. The transform may comprise a discrete cosine transform (DCT) or a conceptually similar transform such as that defined by the ITU H.264 standard or the HEVC standard. So-called "butterfly" structures may be defined to perform the transforms, or matrix-based multiplication could also be used. In some examples, consistent with the HEVC standard, the size of the transform may vary for different CUs, e.g., depending on the level of partitioning that occurs with respect to a given LCU. Transform units (TUs) may be defined in order to set the transform size applied by transform unit 38. Wavelet transforms, integer transforms, sub-band transforms or other types of transforms could also be used. In any case, transform unit applies the transform to the residual block, producing a block of residual transform coefficients. The transform, in general, may convert the residual information from a pixel domain to a frequency domain.

Quantization unit 40 then quantizes the residual transform coefficients to further reduce bit rate. Quantization unit 40, for example, may limit the number of bits used to code each of the coefficients. After quantization, entropy coding unit 46 may scan and entropy encode the data. Again, this scanning may apply to so-called significant coefficients, which define whether each of the quantized and transformed coefficients are significant (i.e., non-zero). Thus, scan unit 45 may receive a set of quantized and transformed coefficients, generate a significance map (as well as the levels or values associated with any significant coefficients), and select and apply a scan order to the significance map. Entropy encoding unit 46 may then apply entropy coding to the scanned coefficients and other values and syntax elements in the encoded bitstream.

In particular, as noted above, scan unit 45 may execute a method of encoding coefficients associated with a block of video data, which may comprise the set of significant coefficients that form the significance map. In encoding the coefficients, scan unit 45 may select a scan order for the coefficients (e.g., significant coefficients) based on an intra coding mode used by prediction unit 42 to predict the block of video data and a transform block size used by transform unit 38 to transform the block of video data. Scan unit 45 may generate a syntax element to communicate the selected scan order for the block of video data. Transform unit 38 and prediction unit 32 may supply the contextual information (e.g., the mode and the block size) as syntax information to entropy coding unit 46.

Once the significance map is scanned by scan unit 45, entropy encoding unit 46 encodes the quantized transform coefficients (e.g., by encoding different elements that define the significance map and the levels associated with any non-zero coefficients) according to an entropy coding methodology. Examples of entropy coding techniques that may be used by entropy coding unit 46 include context adaptive variable length coding (CAVLC) and context adaptive binary arithmetic coding (CABAC). Syntax elements included in the entropy coded bitstream may include prediction syntax from prediction unit 32, such as motion vectors for inter coding or prediction modes for intra coding. Syntax elements included in the entropy coded bitstream may also include filter information from filter unit 47, and the transform block size applied to the video block, e.g., from transform unit 38.

CAVLC is one type of entropy coding technique supported by the ITU H.264 standard and the emerging HEVC standard, which may be applied on a vectorized basis by entropy coding unit 46. CAVLC uses variable length coding (VLC) tables in a manner that effectively compresses serialized "runs" of coefficients and/or syntax elements. CABAC is another type of entropy coding technique supported by the ITU H.264 standard or the HEVC standard, which may be applied on a vectorized basis by entropy coding unit 46. CABAC may involve several stages, including binarization, context model selection, and binary arithmetic coding. In this case, entropy coding unit 46 codes coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. Again, the encoded video may comprise the entropy coded vectors and various syntax information (including the syntax information that informs the decoder of the scan order). Such information can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction unit 32 to produce a reconstructed video block for storage in memory 34. Prior to such storage, however, filter unit 47 may apply filtering to the video block to improve video quality. The filtering applied by filter unit 47 may reduce artifacts and smooth pixel boundaries. Moreover, filtering may improve compression by generating predictive video blocks that comprise close matches to video blocks being coded.

Figure 3:
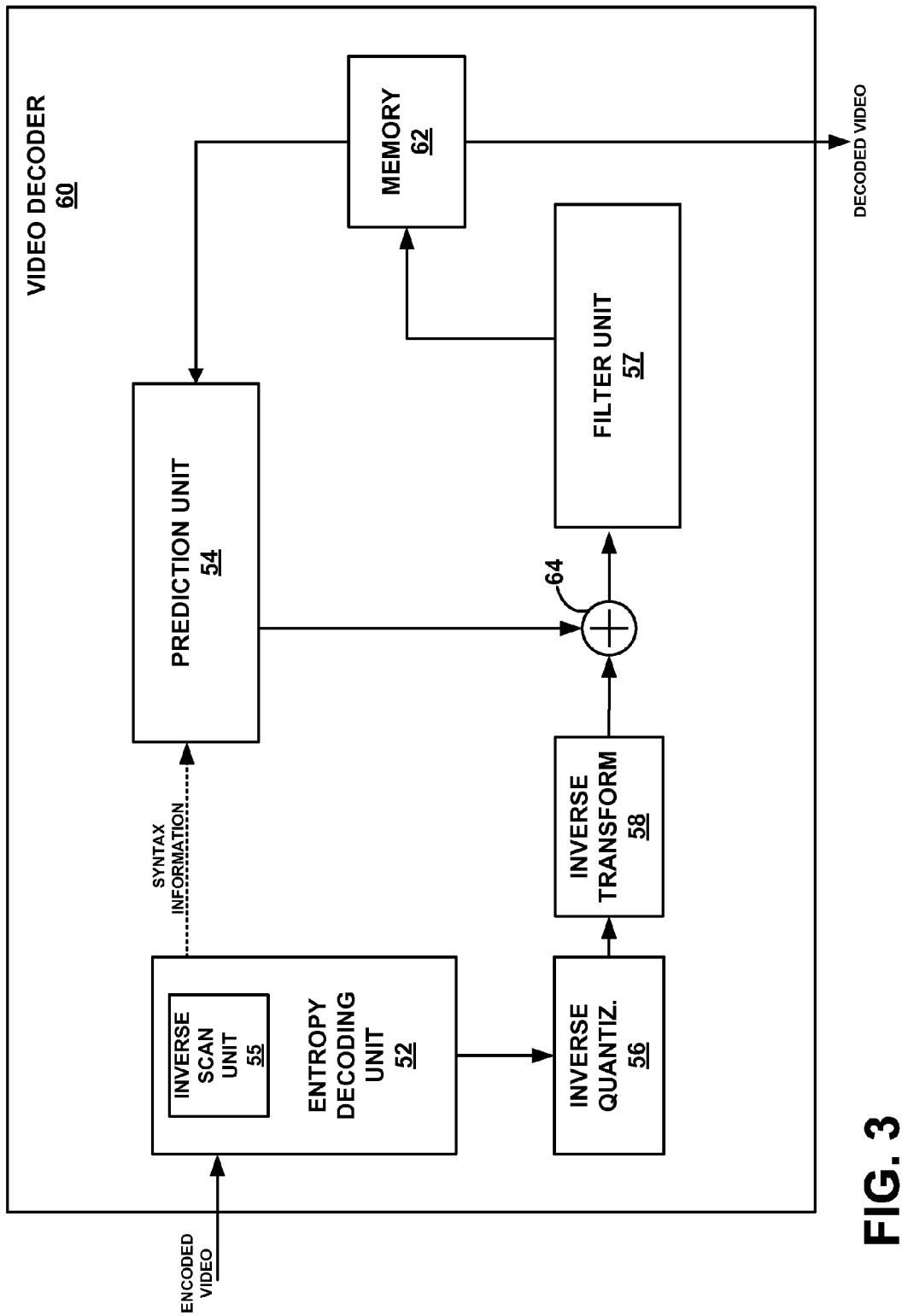
FIG. 3 is a block diagram illustrating an exemplary video decoder consistent with one or more examples of this disclosure.

FIG. 3 is a block diagram illustrating an example of a video decoder 60, which decodes a video sequence that is encoded in the manner described herein. The scanning techniques of this disclosure may be performed by video decoder 60 in some examples. A video sequence received at video decoder 60 may comprise an encoded set of image frames, a set of frame slices, a commonly coded group of pictures (GOPs), or a wide variety of units of video information that include encoded video blocks (such as CUs or macroblocks) and syntax information to define how to decode such video blocks. In some cases, inverse scan unit 55 may simply apply the scan order that is signaled in the encoded bitstream. However, in the switched signaling examples, inverse scan unit 55 may need to determine the top scan order candidates in the same manner that scan unit 45 of encoder 50 determined the top scan order candidates.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Prior to such entropy decoding, however, inverse scan unit 55 is invoked by entropy decoding unit 52 to reconvert the block of video data (e.g., the significance map) from a one-dimensional serialized format back into a two-dimensional block format. Level values associated with any significant coefficients in the significance map may also be decoded.

In one example consistent with switched signaling, at least a portion of a method of decoding coefficients associated with a block of video data is performed by inverse scan unit 55. In particular, inverse scan unit 55 may receive a syntax element with the block of video data, wherein the syntax element defines a scan order from a set of top scan order candidates. Inverse scan unit 55 may define the set of top scan order candidates based on one or both of an intra coding mode used to predict the block of video data and a transform block size used in transforming the block of video data, and inverse scan the block of video data from a serialized representation of the block of video data to a two-dimensional representation of the block of video data based on the syntax element relative to the defined set of top scan order candidates. Again, the coefficients may comprise significant coefficients and zero value coefficients, and the block of video data may comprise a significance map that defines the significant coefficients and the zero value coefficients. Levels may be defined and communicated for those transform coefficients that are identified as being significant.

Video decoder 60 also includes a prediction unit 54, an inverse quantization unit 56, an inverse transform unit 58, a memory 62, and a summer 64. In particular, like video encoder 50, video decoder 60 includes a prediction unit 54 and a filter unit 57. Prediction unit 54 of video decoder 60 may include motion compensation elements and possibly one or more interpolation filters for sub-pixel interpolation in the motion compensation process. Filter unit 57 may filter the output of summer 64, and may receive entropy decoded filter information so as to define the filter coefficients applied in the loop filtering.

The scan order signaling may occur on a block-by-block basis, e.g., for macroblocks in H.264 or for CUs in HEVC. Consistent with the emerging HEVC standard, a slice of video data may correspond to a set of LCUs that define some or all of a video frame. LCUs may refer to coded units within the HEVC framework, which themselves may be sub-divided into smaller CUs according to quadtree partitioning. With quadtree partitioning, a square-shaped LCU is divided into four square shaped coded units, and the coded units may also be subdivided into smaller coded units according to quadtree partitioning. Flags may be associated with each CU to indicate whether further quadtree partitioning was used. An LCU may be sub-divided into four CUs, and the four CUs may each be further divided into smaller CUs. The HEVC standard may support up to three levels of quadtree partitioning of the original LCU, or possibly more. After partitioning the LCU into various CUs, the different CUs may be further partitioned into PUs, which are the predictive sizes used to predict the CU. PUs may assume square-shapes or other rectangular shapes.

Figure 5:
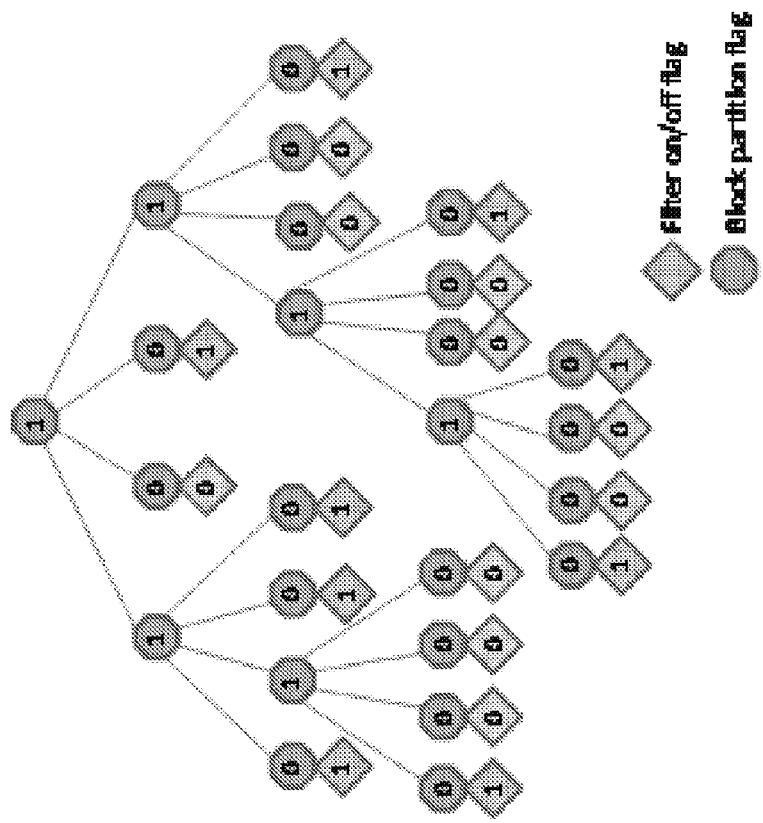
FIG. 5 is a decision tree representing partitioning decisions that result in the quadtree partitioning shown in FIG. 4.
Figure 4:
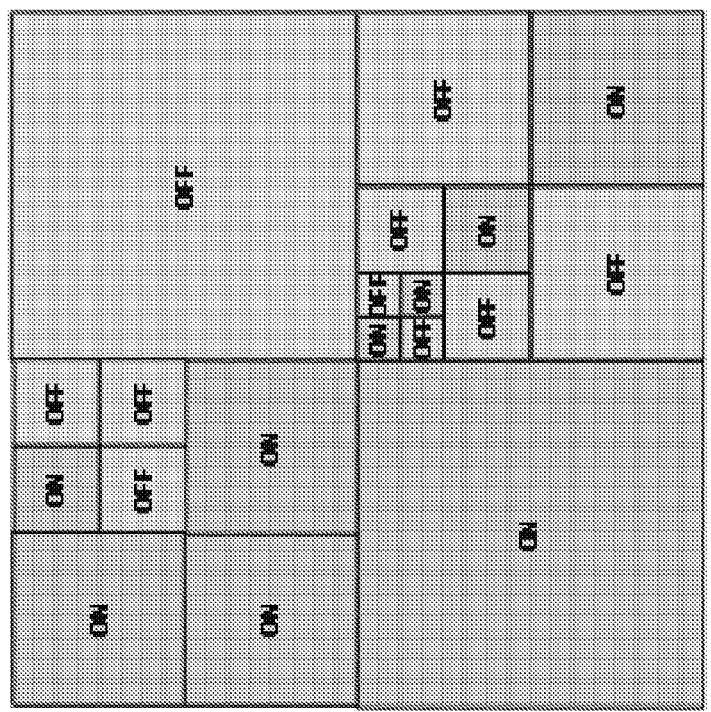
FIG. 4 is a conceptual diagram of video blocks partitioned according to a quadtree partitioning scheme.

FIGS. 4 and 5 show one example of how a video block within a slice (e.g., an LCU) can be partitioned into sub-blocks (e.g., smaller CUs). As shown in FIG. 4, the quadtree sub-blocks indicated by "ON" may be filtered by loop filters, while quadtree sub-blocks indicated by "OFF" may not be filtered. The decision of whether or not to filter a given block or sub-block may be determined at the encoder by comparing the filtered result and the non-filtered result relative to the original block being coded. FIG. 5 is a decision tree representing partitioning decisions that results in the quadtree partitioning shown in FIG. 4. FIGS. 4 and 5 may be individually or collectively viewed as a filter map that can be generated at an encoder and communicated to a decoder at least once per slice of encoded video data. The scan order used for any transform unit defined for a given CU may be determined at the video encoder and communicated to the video decoder as part of the block-level syntax.

With the emerging HEVC standard, transforms (such as discrete cosine transforms, integer transforms, Karhunen-Loeve Transforms, or the like) may be used to decompose the coefficients of a residual block of data to the frequency domain. Then, a "significance map," which shows the distribution of significant (i.e., non-zero) coefficients in the transform block can be encoded. The levels (i.e. the actual values) associated with the significant coefficients can also be encoded. A scan unit (such as scan unit 45 of FIG. 2) may be used to perform these encoding steps.

To efficiently encode the significance map, a zigzag scanning order may be used with a general assumption that most of the non-zero coefficients are likely located in the low frequency area (upper-left corner) of a transform block. However, to further improve the efficiency of transform coefficients coding, additional scanning orders (such as horizontal and vertical scanning) can be used in instances where it improves the coding efficiency. Horizontal scanning, for example, may follow a raster-scan order. More complex and adaptive scanning orders may also be defined and used, consistent with the techniques of this disclosure.

In this disclosure, scan unit 45 implements different scanning orders for different intra prediction modes based on the type of intra prediction mode and the transform block size used in transforming a given block of transform coefficients. In one example, the selection may be among horizontal, vertical and raster scanning orders. The desired scanning order, e.g., in the sense of rate-distortion, can be decided by video encoder 50 (e.g., by scan unit 45) by searching among zigzag, horizontal, and vertical orders (or other scan orders, if desired). The selected scanning order can be transmitted within the bitstream (e.g., as block level syntax) to the decoder.

Consistent with the HEVC standard, transform unit 38 may support differently sized transforms. For example, 128×128 transforms, 64×64 transforms, 32×32 transforms, 16×16 transforms, 8×8 transforms, 4×4 transforms and 2×2 transforms may all be supported. This disclosure, in one example, describes a mode dependent fixed transform coefficient coding technique that may be specifically desirable for intra blocks. The mode dependent fixed transform coefficient coding technique may associate the scan order with the intra prediction mode, which means the scan order for an intra prediction mode may be fixed for a given transform size. Scan unit 45 may avoid an exhaustive search among several scan orders in order to reduce complexity as if there are only a few possible scan orders, and at the same time, scan unit 45 may exploit some of the benefits associated with multiple scan orders. Fixing the scan order for both encoding and decoding may be particularly desirable for easy and parallel implementation.

In one example, the techniques of this disclosure may focus on intra block coding. In H.264/AVC and the Test Model of the emerging HEVC standard, directional extrapolation methods may be used to predict an intra block. Because of the directional prediction (i.e., based on intra data within the same video slice), the residual block (in the pixel domain) usually exhibits directional characteristics, which are then inherited into the transformed coefficient block (in the transform domain). For this reason, a mode dependent scanning scheme for transform coefficients (or simply for significant coefficients of a significance map) may be very useful to improve coding efficiency.

Figure 6A:
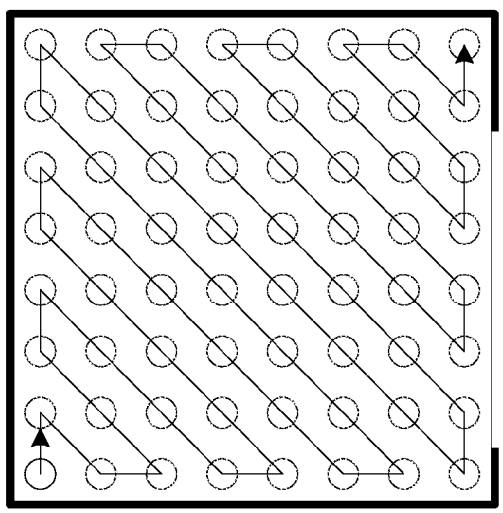
FIGS. 6A-6C are conceptual diagrams illustrating exemplary scan orders, including a zig-zag scan (FIG. 6A), a horizontal scan (FIG. 6B) and a vertical scan (FIG. 6C).
Figure 6B:
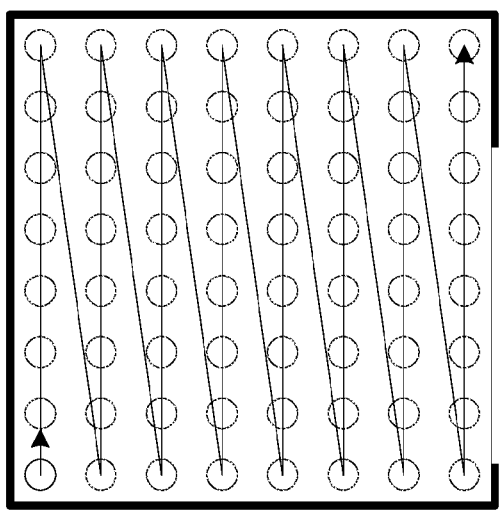
Figure 6C:
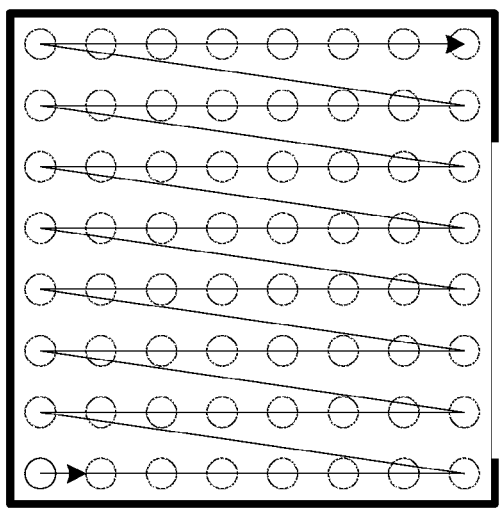

Although the example below discusses three scanning orders, additional scanning orders could also be defined and used. The three exemplary scanning orders may include: the zigzag scan (FIG. 6A), the horizontal scan (FIG. 6B), and the vertical scan (FIG. 6C). Variations such as combinations of zigzag scanning and vertical or horizontal scanning could also be used, as well as more complex (and possibly adaptive) scan orders.

Figure 7:
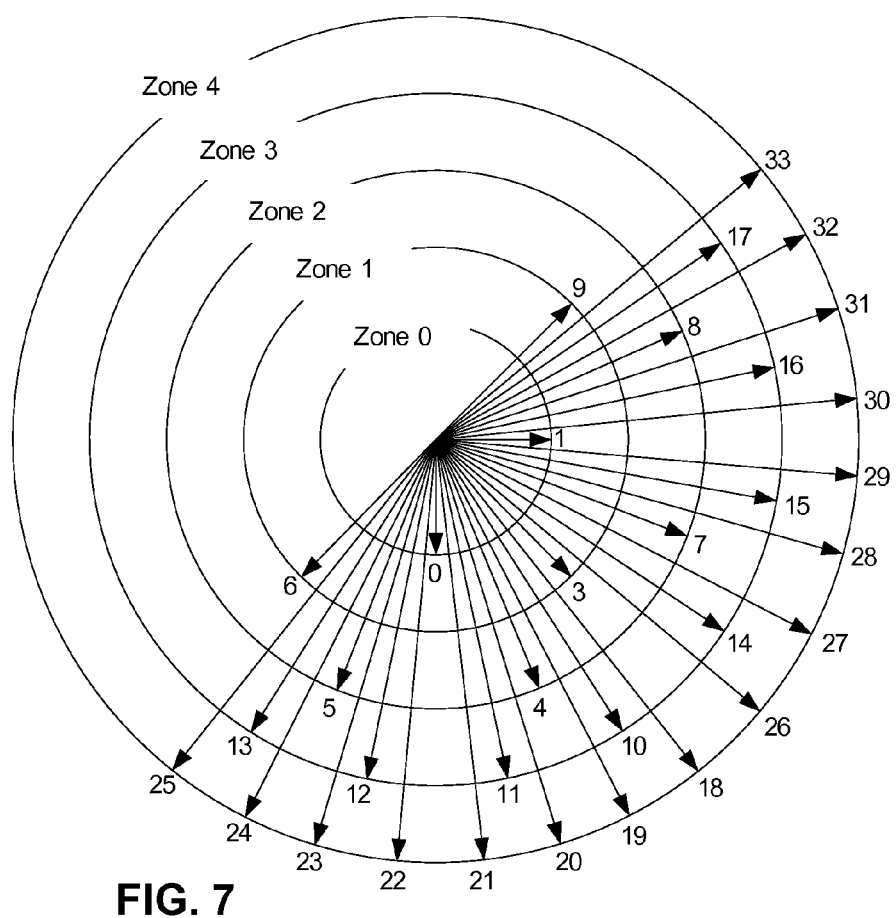
FIG. 7 is a conceptual diagram illustrating exemplary prediction modes consistent with the emerging HEVC standard.
Figure 8:
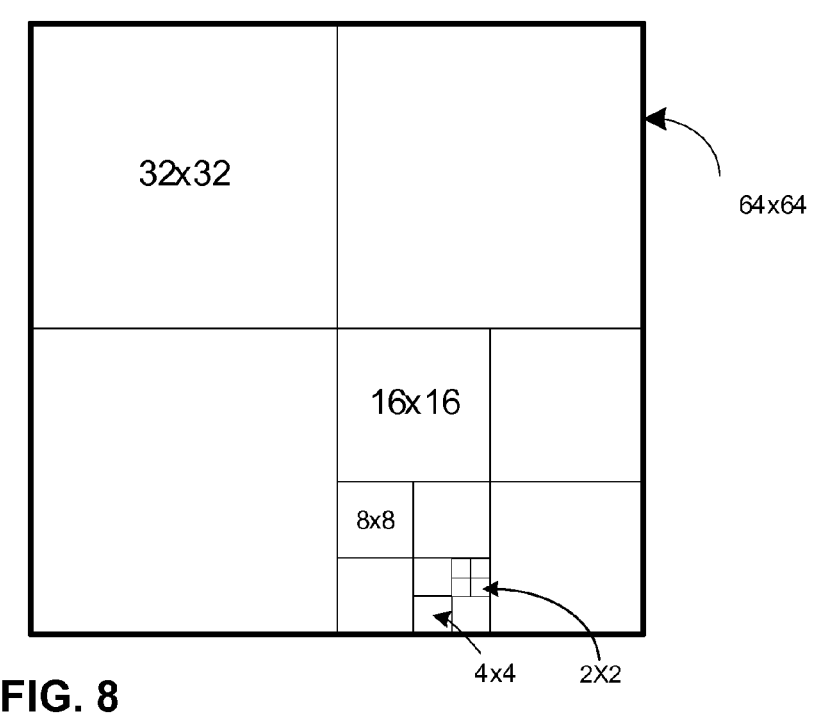
FIG. 8 is another conceptual diagram of video blocks partitioned according to a quadtree partitioning scheme.

Exemplary intra prediction directions and mode index, consistent with the Test Model of HEVC, are shown in FIG. 7. The block may have a size between 2×2 and 128×128. A mapping function F(*) in Equation (1) below, can be built to map an intra prediction mode (predMode) of a block with size (blkSize) to a scanning order (scanIdx) among zigzag, horizontal and vertical scanning patterns (or other scan orders). The techniques may define the scanIdx values for the three scanning orders as set forth in the TABLE 1 provided in FIG. 9.

$$\text{scanIdx}=F(\text{predMode},\text{blkSize}) \quad \text{Equation (1)}$$

The mapping function may comprise a mathematical model or a mapping table, which can be stored at both encoder 50 and decoder 60. In one example, the mapping function can be implemented as a mapping table as set forth in the TABLE 2 of FIG. 10. In this case, the intra mode index from 1-33 (i.e., predMode) and the size of the transform (i.e., blkSize) may be indexes to the table that maps to a scan order value of TABLE 1 provided in FIG. 9. TABLE 1 provided in FIG. 9 may be a fixed table stored at the encoder and the decoder, and the mode indexes of the table may be selected based on empirical testing of various different video sequences.

TABLE 2 of FIG. 10 may comprise a table applied with respect to "luma blocks." For chroma blocks, a similar lookup table approach can be used to determine scan directions using table below. The chroma lookup table may have many fewer modes, as chroma blocks may only support 4 intra modes, in one example consistent with the emerging HEVC standard. TABLE 3 of FIG. 11 may comprise the corresponding chroma lookup table relative to the luma lookup table (TABLE 2) of FIG. 10.

In a further example, a mode dependent switchable transform coefficient coding technique may be used by scan unit 45 and scan unit 55. In this case, top scanning order candidates may be defined for each prediction mode, for each transform size, or for the different combinations of prediction mode and transform size. In this case, the best scanning order for a block may be determined scan unit 45 among the top candidates in the set for a given prediction mode, but the number of candidates may be fewer than the total number of possible scanning orders. This technique may add some complexity to encoder 50 (and decoder 60), but at the same time, can limit the complexity to a fixed number of candidate scan orders. Moreover, the candidates may be different depending on the intra prediction mode, the transform block size, or both the intra prediction mode, the transform block size.

TABLE 4 in FIG. 12 illustrates an exemplary mapping of possible scan orders to index values. Scan units 45 and 55 can identify a score function for each scanning order "Fs(*)" according to Equation (2) and this score function may calculate how likely a scanning order can be selected to be the candidate of the block with size blkSize and prediction mode predMode.

$$s(\text{scanIdx})=Fs(\text{predMode},\text{blkSize},\text{scanIdx}) \quad \text{Equation (2)}$$

Based on the score value s, calculated by Equation (2), scan units 45 and 55 can define the top three candidates for each prediction mode predMode associated with a given transform block size blkSize. TABLE 5 of FIG. 13 provides one example of a candidate table that is generated by the above procedure for one given block size. According to this technique, scan unit 45 can signal one of three states (candidate0, candidate1 and candidate2) in this switchable scheme, but the candidates can map to different scan orders, depending on the mode. Scan unit 55 can apply the same candidate table so that the three states properly map to the correct candidates.

Accordingly, with the candidate table generated, a switchable scheme can be used to search for the best scanning order in the sense of the rate distortion cost among the candidates for a block having a particular prediction mode and particular block size. The best scanning order can be signaled in the bitstream as video block syntax. Because the candidate set is usually smaller than the set of all scanning orders allowed, the amount of signaling information can be significantly reduced relative to a scheme that signals a choice relative to all possible candidate scan orders.

Figure 14:
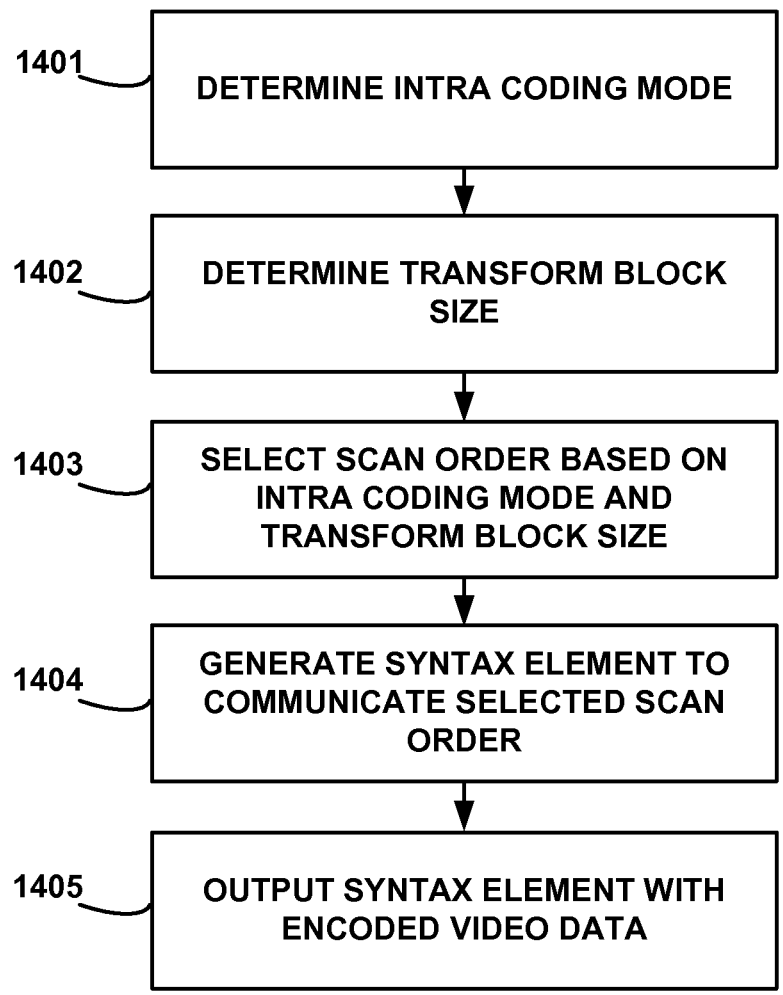
FIGS. 14-16 are flow diagrams illustrating techniques consistent with this disclosure.

FIG. 14 is a flow diagram illustrating a technique consistent with this disclosure. FIG. 14 will be described from the perspective of video encoder 50 of FIG. 2, although other devices may perform similar techniques. In particular, FIG. 14 shows one method of encoding coefficients (e.g., significant coefficients) associated with an intra-coded block of video data. Scan unit 45 determines an intra coding mode (1401) and determines a transform block size that was used in the encoding process (1402). In particular, transform unit 38 and prediction unit 32 may communicate syntax information to scan unit 45 to facilitate these determinations. Transform unit 38 may communicate the transform size to scan unit 45 and prediction unit may communicate the intra coding mode to scan unit 45. Scan unit 45 can then select a scan order based on the intra coding mode and the transform block size (1403), and generate a syntax element to communicate the selected scan order (1404). Following entropy coding by entropy coding unit 46, video encoder 50 may output the syntax element with the encoded video data (1405). In this manner, the scan order can be encoded as part of an encoded video bitstream, and output for communication to another device so that the other device can determine how to perform the reciprocal (inverse) scan during a decoding process.

Figure 15:
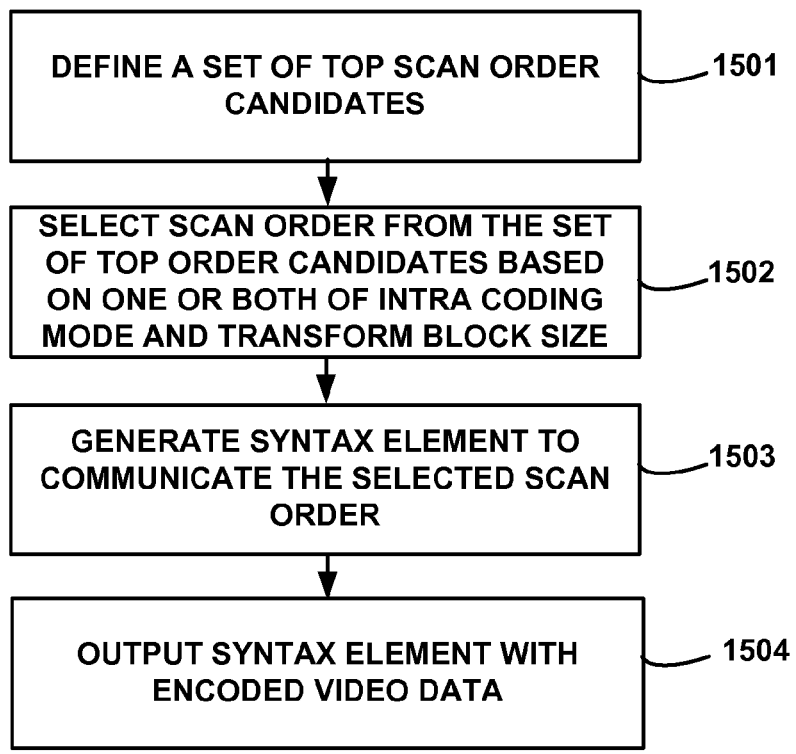

FIG. 15 is a flow diagram illustrating a switched signaling technique consistent with this disclosure. FIG. 15 will be described from the perspective of video encoder 50 of FIG. 2, although other devices may perform similar techniques. As shown in FIG. 15, scan unit 45 define a set of top scan order candidates (1501), and selects a scan order from the set of top scan order candidates based on an intra coding mode, a transform block size, or both the intra coding mode and transform block size used to encode the block of video data (1502). The set of top scan order candidates may be programmed into scan unit 45 for intra coding modes, transform block sizes or combinations of intra coding mode and transform block size. By defining a set of top scan order candidates, the number of possibilities can be limited so as to limit the computations and limit the amount of signaling overhead. Scan unit 45 generates a syntax element to communicate the selected scan order (1503), and following entropy coding by entropy coding unit 46, video encoder 50 may output the syntax element with the encoded video data (1504).

In order to support the technique of FIG. 15 both video encoder 50 and video decoder 60 may be configured to define the same set of top scan order candidates in different scenarios. The syntax element that defines the scan order is dependent upon the set of top scan order candidates, which video encoder 50 and video decoder 60 may each define in a similar manner.

Figure 16:
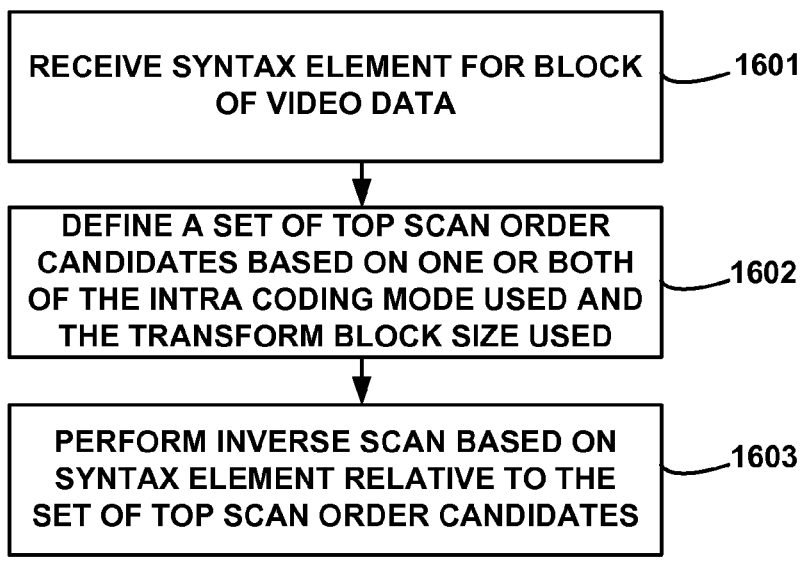

FIG. 16 is a flow diagram illustrating a switched signaling technique from the perspective of video decoder 60, consistent with this disclosure. Although FIG. 16 is described from the perspective of video decoder 60 of FIG. 3, other devices may perform similar techniques. As shown in FIG. 16, entropy decoding unit 52 receives a syntax element for a block of video data (e.g., a block of significant coefficients). Inverse scan unit 55 defines a set of top scan order candidates based on one or both of the intra coding mode used in coding the video data and the transform block size used (1602). This allows inverse scan unit 55 to properly interpret the received syntax element, which may comprise an index value relative to the set of top scan order candidates. Accordingly, inverse scan unit 55 performs an inverse scan based on the syntax element relative to the set of top scan order candidates (1603).

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise a tangible computer readable storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of decoding transform coefficients associated with residual data of a block of video data, the method comprising:

determining a scan order for the transform coefficients associated with the residual data of the block of video data based on an intra coding mode used to predict the block of video data and a transform block size used in transforming the block of video data, including:

for 4×4 and 8×8 transform block sizes, determining the scan order from one of three predefined scan orders including at least a horizontal scan order and a vertical scan order for the coefficients based on the intra coding mode; and for a transform block size other than 4×4 and 8×8, determining the scan order other than the horizontal scan order and the vertical scan order for the intra coding mode; and inverse scanning the transform coefficients from a serialized representation of the transform coefficients to a two-dimensional representation of the transform coefficients data corresponding to the block sizes based on the determined vertical, horizontal, or other than horizontal and vertical scan orders.

2. The method of claim 1, wherein the transform coefficients comprise significant coefficients and zero value coefficients and the block of video data comprises a significance map that defines the significant coefficients and the zero value coefficients.

3. The method of claim 2, wherein the significant coefficients comprise one-bit flags that identify non-zero value coefficients.

4. The method of claim 1, further comprising:
determining the scan order from a first lookup table for luma blocks; and
determining the scan order from a second lookup table for chroma blocks.

5. The method of claim 1, wherein the a block of video data comprises a coded unit (CU) within a largest coded unit (LCU), wherein the LCU is partitioned into a set of CUs according to a quadtree partitioning scheme.

6. A method of encoding transform coefficients associated with residual data of a block of video data, the method comprising:
determining a scan order for the transform coefficients associated with the residual data of the block of video data based on an intra coding mode used to predict the block of video data and a transform block size used in transforming the block of video data, including:
for 4×4 and 8×8 transform block sizes, determining the scan order from one of three predefined scan orders including at least a horizontal scan order and a vertical scan order for the coefficients based on the intra coding mode; and
for a transform block size other than 4×4 and 8×8, determining the scan order other than the horizontal scan order and the vertical scan order for the intra coding mode; and
scanning the transform coefficients data from a two-dimensional representation of the transform coefficients to a serialized representation of the transform coefficients corresponding to the block sizes based on the determined vertical, horizontal, or other than horizontal and vertical scan orders.

7. The method of claim 6, wherein the transform coefficients comprise significant coefficients and zero value coefficients and the block of video data comprises a significance map that defines the significant coefficients and the zero value coefficients.

8. The method of claim 7, wherein the significant coefficients comprise one-bit flags that identify non-zero value coefficients.

9. The method of claim 6, further comprising:
determining the scan order from a first lookup table for luma blocks; and
determining the scan order from a second lookup table for chroma blocks.

10. The method of claim 6, wherein the a block of video data comprises a coded unit (CU) within a largest coded unit (LCU), wherein the LCU is partitioned into a set of CUs according to a quadtree partitioning scheme.

11. An apparatus configured to decode transform coefficients associated with residual data of a block of video data, the apparatus comprising:
a video decoder configured to:
determine a scan order for the transform coefficients associated with the residual data of the block of video data based on an intra coding mode used to predict the block of video data and a transform block size used in transforming the block of video data, including:
for 4×4 and 8×8 transform block sizes, determine the scan order from one of three predefined scan orders including at least a horizontal scan order and a vertical scan order for the coefficients based on the intra coding mode; and
for a transform block size other than 4×4 and 8×8, determine the scan order other than the horizontal scan order and the vertical scan order for the intra coding mode; and
inverse scan transform coefficients from a serialized representation of the transform coefficients to a two-dimensional representation of the transform coefficients corresponding to the block sizes based on the determined vertical, horizontal, or other than horizontal and vertical scan orders.

12. The apparatus of claim 11, wherein the transform coefficients comprise significant coefficients and zero value coefficients and the block of video data comprises a significance map that defines the significant coefficients and the zero value coefficients.

13. The apparatus of claim 12, wherein the significant coefficients comprise one-bit flags that identify non-zero value coefficients.

14. The apparatus of claim 11, wherein the video decoder is further configured to:
determine the scan order from a first lookup table for luma blocks; and
determine the scan order from a second lookup table for chroma blocks.

15. The apparatus of claim 11, wherein the a block of video data comprises a coded unit (CU) within a largest coded unit (LCU), wherein the LCU is partitioned into a set of CUs according to a quadtree partitioning scheme.

16. An apparatus configured to encode transform coefficients associated with residual data of a block of video data, the apparatus comprising:
a video encoder configured to:
determine a scan order for the transform coefficients associated with the residual data of the block of video data based on an intra coding mode used to predict the block of video data and a transform block size used in transforming the block of video data, including:
for 4×4 and 8×8 transform block sizes, determine the scan order from one of three predefined scan orders including at least a horizontal scan order and a vertical scan order for the coefficients based on the intra coding mode; and
for a transform block size other than 4×4 and 8×8, determine the scan order other than the horizontal scan order and the vertical scan order for the intra coding mode; and
scan the transform coefficients from a two-dimensional representation of the transform coefficients to a serialized representation of the transform coefficients corresponding to the block sizes based on the determined vertical, horizontal, or other than horizontal and vertical scan orders.

17. The apparatus of claim 16, wherein the transform coefficients comprise significant coefficients and zero value coefficients and the block of video data comprises a significance map that defines the significant coefficients and the zero value coefficients.

18. The apparatus of claim 17, wherein the significant coefficients comprise one-bit flags that identify non-zero value coefficients.

19. The apparatus of claim 16, wherein the video encoder is further configured to:

determine the scan order from a first lookup table for luma blocks; and determine the scan order from a second lookup table for chroma blocks.

20. The apparatus of claim 16, wherein the a block of video data comprises a coded unit (CU) within a largest coded unit (LCU), wherein the LCU is partitioned into a set of CUs according to a quadtree partitioning scheme.

21. A non-transitory computer-readable medium storing instructions that, when executed, cause one or more processors of a device configured to decode transform coefficients associated with residual data of a block of video data to:

determine a scan order for the transform coefficients associated with the residual data of the block of video data based on an intra coding mode used to predict the block of video data and a transform block size used in transforming the block of video data, including:

for 4×4 and 8×8 transform block sizes, determine the scan order from one of three predefined scan orders including at least a horizontal scan order and a vertical scan order for the coefficients based on the intra coding mode; and for a transform block size other than 4×4 and 8×8, determine the scan order other than the horizontal scan order and the vertical scan order for the intra coding mode; and inverse scan the transform coefficients from a serialized representation of the transform coefficients to a two-dimensional representation of the transform coefficients corresponding to the block sizes based on the determined vertical, horizontal, or other than horizontal and vertical scan orders.

22. The non-transitory computer-readable medium of claim 21, wherein the transform coefficients comprise significant coefficients and zero value coefficients and the block of video data comprises a significance map that defines the significant coefficients and the zero value coefficients.

23. The non-transitory computer-readable medium of claim 22, wherein the significant coefficients comprise one-bit flags that identify non-zero value coefficients.

24. The non-transitory computer-readable medium of claim 21, wherein the instructions further cause the one or more processors to:

determine the scan order from a first lookup table for luma blocks; and determine the scan order from a second lookup table for chroma blocks.

25. The non-transitory computer-readable medium of claim 21, wherein the a block of video data comprises a coded unit (CU) within a largest coded unit (LCU), wherein the LCU is partitioned into a set of CUs according to a quadtree partitioning scheme.

26. A non-transitory computer-readable medium storing instructions that, when executed, cause one or more processors of a device configured to encode transform coefficients associated with residual data of a block of video data to:

determine a scan order for the transform coefficients associated with the residual data of the block of video data based on an intra coding mode used to predict the block of video data and a transform block size used in transforming the block of video data, including:

for 4×4 and 8×8 transform block sizes, determine the scan order from one of three predefined scan orders including at least a horizontal scan order and a vertical scan order for the coefficients based on the intra coding mode; and for a transform block size other than 4×4 and 8×8, determine the scan order other than the horizontal scan order and the vertical scan order for the intra coding mode; and scan the transform coefficients from a two-dimensional representation of the transform coefficients to a serialized representation of the transform coefficients corresponding to the block sizes based on the determined vertical, horizontal, or other than horizontal and vertical scan orders.

27. The non-transitory computer-readable medium of claim 26, wherein the transform coefficients comprise significant coefficients and zero value coefficients and the block of video data comprises a significance map that defines the significant coefficients and the zero value coefficients.

28. The non-transitory computer-readable medium of claim 27, wherein the significant coefficients comprise one-bit flags that identify non-zero value coefficients.

29. The non-transitory computer-readable medium of claim 26, wherein the instructions further cause the one or more processors to:

determine the scan order from a first lookup table for luma blocks; and determine the scan order from a second lookup table for chroma blocks.

30. The non-transitory computer-readable medium of claim 26, wherein the a block of video data comprises a coded unit (CU) within a largest coded unit (LCU), wherein the LCU is partitioned into a set of CUs according to a quadtree partitioning scheme.

* * * * *